US006640958B2

(12) United States Patent
Postlmayr

(10) Patent No.: US 6,640,958 B2
(45) Date of Patent: Nov. 4, 2003

(54) CONVEYING DEVICE FOR PERSONS, WITH DIRECTLY DRIVEN STEP BODIES AND A STEP BODY FOR SUCH A DEVICE

(75) Inventor: Leopold Postlmayr, Windischgarsten (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/147,369

(22) Filed: May 16, 2002

(65) Prior Publication Data

US 2002/0175040 A1 Nov. 28, 2002

(30) Foreign Application Priority Data

May 16, 2001 (EP) .......................................... 01810483

(51) Int. Cl.[7] .............................................. B65G 15/00
(52) U.S. Cl. ...................................... 198/321; 104/288
(58) Field of Search ............................ 198/321, 465.1, 198/322, 326, 334; 104/288

(56) References Cited

U.S. PATENT DOCUMENTS 3,650,216 A * 3/1972 Harwick et al. ............ 104/166
3,866,538 A 2/1975 Forsey, Jr.
3,918,367 A * 11/1975 Alimanestianu et al. .... 104/127
4,569,433 A * 2/1986 Ishida et al. ................ 198/333
4,920,890 A * 5/1990 Barber ........................ 104/53
4,955,291 A * 9/1990 Dillon et al. ............... 104/299
4,966,080 A * 10/1990 Teissier et al. ............. 104/289
4,987,834 A * 1/1991 Peck et al. .................. 104/300
5,595,121 A * 1/1997 Elliott et al. .................. 104/53
5,778,796 A 7/1998 Kim
6,092,468 A * 7/2000 Hase ........................... 105/73
6,129,025 A 10/2000 Minakami et al.
6,138,575 A * 10/2000 Geng ......................... 104/140
6,418,855 B1 * 7/2002 Fischer ....................... 104/118

FOREIGN PATENT DOCUMENTS

DE 198 37 915 A1 3/2000
EP 458 722 A1 11/1991

* cited by examiner

*Primary Examiner*—Christopher P. Ellis
*Assistant Examiner*—Richard Ridley
(74) *Attorney, Agent, or Firm*—Schweitzer Cornman Gross & Bondell LLP

(57) ABSTRACT

A chain-free conveying device for persons has directly driven step bodies which run forward in one direction one after the other and run back more quickly thereunder. Each step body runs on rollers, of which two may each be driven by a respective electric motor. Each step body includes a device for the supplying of electrical current to the step body. Each step body has at least one sensor for determining spacing from the adjacent step bodies. A control electronic system controls the electric motors in dependence on a signal from the sensors, so that the step bodies run directly one after the other in a person transport region. A respective tipping station for inclining the step bodies is provided at each of the ends of the conveying device. In preferred embodiments the step bodies are directly driven by a friction wheel drive or by means of toothed wheels.

10 Claims, 3 Drawing Sheets

CONVEYING DEVICE FOR PERSONS, WITH DIRECTLY DRIVEN STEP BODIES AND A STEP BODY FOR SUCH A DEVICE

The present invention relates to a conveying device for persons with directly driven step bodies which run forward in one direction one after the other and run back substantially thereunder. A conveying device for persons" is to be understood to include a moving walkway or an escalator, and that "step bodies" includes plates or steps as appropriate.

BACKGROUND OF THE INVENTION

Such a conveying device for persons is known, for example, in the form of a moving walkway from DE 19837915 A1. The plates are driven by means of a linear drive. For this purpose, they have permanent magnets which co-operate in a known manner with coils arranged thereunder. So that the position of the plates relative to one another is maintained, a chain to which the plates are fastened is, as in the case of conventional moving walkways, provided. In this known moving walkway the chain serves, however, only for guidance, the motive forces for the drive being primarily exerted by the linear drive. By virtue of the direct drive, wear of the chain is, in fact, lessened, but nevertheless still present, which has the consequence of requiring corresponding maintenance operations. A further disadvantage is that the position of the plates relative to one another must always be the same so that the plates directly adjoin one another even in the return run.

It is the object of the present invention to eliminate these disadvantages and to create a conveying device, and a step plate for such a device, with reduced maintenance outlay, for persons.

BRIEF DESCRIPTION OF THE INVENTION

According to the invention this object is met by a conveying device for persons of the aforementioned general type, wherein the conveying device for persons is chain-free, that each step body runs on rollers and is driven by at least one electric motor. Each step body has a device for current supply and at least one sensor for determining the spacing from an adjacent step body, wherein a control electronic system is provided which controls the electric motor or motors in dependence on the signal of the sensor or the sensors. A respective tipping station for inclining the step bodies is provided at each of the ends of the conveying device.

According to the present invention several step bodies, preferably at regular spacings, or, alternatively each step body, have or has its own drive. A central drive is no longer present, and the otherwise usual chain, which connects all step bodies together into a step body belt, i.e. into a plate belt or a step belt, is also absent. Each step body can therefore be individually exchanged if maintenance should be necessary. This shortens replacement time, so that the conveying device has to be taken out of operation only very briefly. The step bodies do not need to be turned over at the ends of the conveying device so that the step bodies can also run back. Tipping stations are therefore present where the step bodies are inclined so that they pass from one path to another path. The installed drive is thus available even for return running. A further advantage results from the fact that in the case of conveying devices for persons, which are exposed to rain, no water can collect in the underside of the step bodies during the return run.

A particular advantage of the present invention consists in that the step bodies can be allowed to run back more quickly than they run forward. Thus, fewer step bodies are required for the conveying device for persons than previously needed.

Each step body may be connected to a current supply rail by way of wipers. The current supply rail may have a copper track, and the wiper a spring-loaded electrical carbon brush. A reliable current supply of the step body is thereby ensured.

In a preferred development of the invention, in the case of a moving walkway, the guide tracks and the necessary shafts may be provided at the building side. Only the self-propelled plates and the current supply devices remain to be installed. Large free lengths of the moving walkway support frame which depend on the construction and the guide tracks thereof are avoided and the costs of such moving walkways or escalators are thereby reduced. Since there is no cantilevered support and guide tracks to be set into oscillation by the plates travelling therealong, a moving walkway of the present invention is distinguished by a high degree of quiet running.

The present invention also comprises a step body for a conveying device for persons, which is characterised by the fact that it runs on rollers, of which at least one is driven by an electric motor. The step body has means for current supply and at least one sensor for determining the spacing from another step body, wherein a control electronic system is provided which controls the electric motor or the electric motors in dependence on the signal of the sensor or the sensors.

Preferably, two rollers are driven by two mutually independent electric motors. In this manner the step bodies are largely secure against breakdown, because they can also be driven, if necessary, by one of the electric motors. It is also advantageous if four sensors are mounted at the four corners of the step body. Thus, the spacing can be ascertained not only from the step body in front, but also from the step body behind, and also slight angled deviations between the step bodies relative to the travel direction can be recognised.

A drive which provides particularly true tracking is achieved if the electric motor drives front and rear rollers. In that case, the rollers can, particularly in the case of use for an escalator, be constructed as gearwheels which engage in racks, or corresponding appropriate profile members, fixedly arranged along the travel path. Such a mechanically positive or force-locking drive makes it possible to transport large conveyed loads, in a given case over large inclinations, and to dimension the conveying path to be as short as possible in the case of bridging over a predetermined height difference.

According to a further preferred embodiment the guide rollers of the step body may run as non-driven rollers along the guide tracks, while the drive of the step body takes place by way of a so-called friction wheel drive. The electric motor mounted to the step body in that drives a friction wheel, which is pressed by means of spring force against a stationary drive rail mounted along the travel path, and moves the step body while it rolls along the drive rail.

The current rail and the guide rail may be physically connected together in such an embodiment. This simplifies mounting and ensures a reliable current supply of the electric motor.

BRIEF DESCRIPTION OF THE DRAWINGS

Further details, features and advantages of the invention are evident not only from the dependent claims and the features to be inferred—by themselves and/or in combination—therefrom, but also from the following description of preferred examples of embodiment by reference to the accompanying drawings, in which:

DETAILED DESCRIPTION OF THE INVENTION

Figure 1:
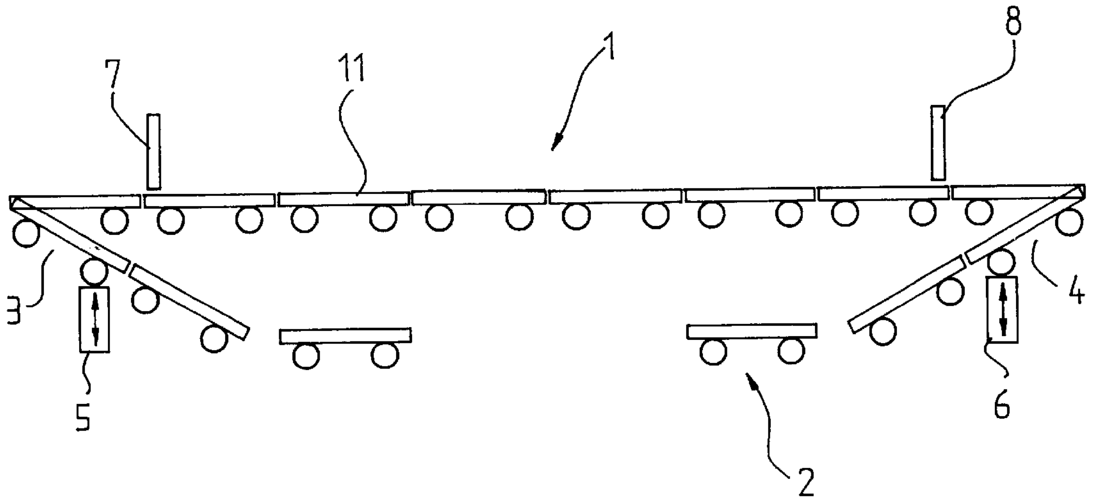
FIG. 1 is a schematic view from the side of a moving walkway according to the invention.

A conveying device for persons according to the invention is illustrated in FIG. 1 in the form of a moving walkway. In the moving walkway there is a region 1 for the transport of persons, wherein plates 11 run forwards, and thereunder a region 2 for the return run of the plates. Since the plates can run in the region 2 substantially more quickly than in the region 1, substantially fewer plates are present there, so that, overall, less plates are necessary for the moving walkway according to the invention than in the case of conventional moving walkways.

Figure 2:
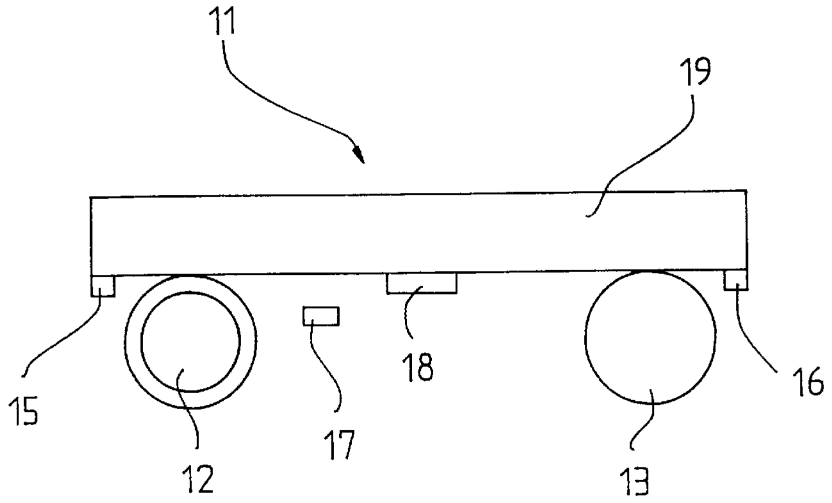
FIG. 2 is a view of a plate according to the invention, from the side.
Figure 3:
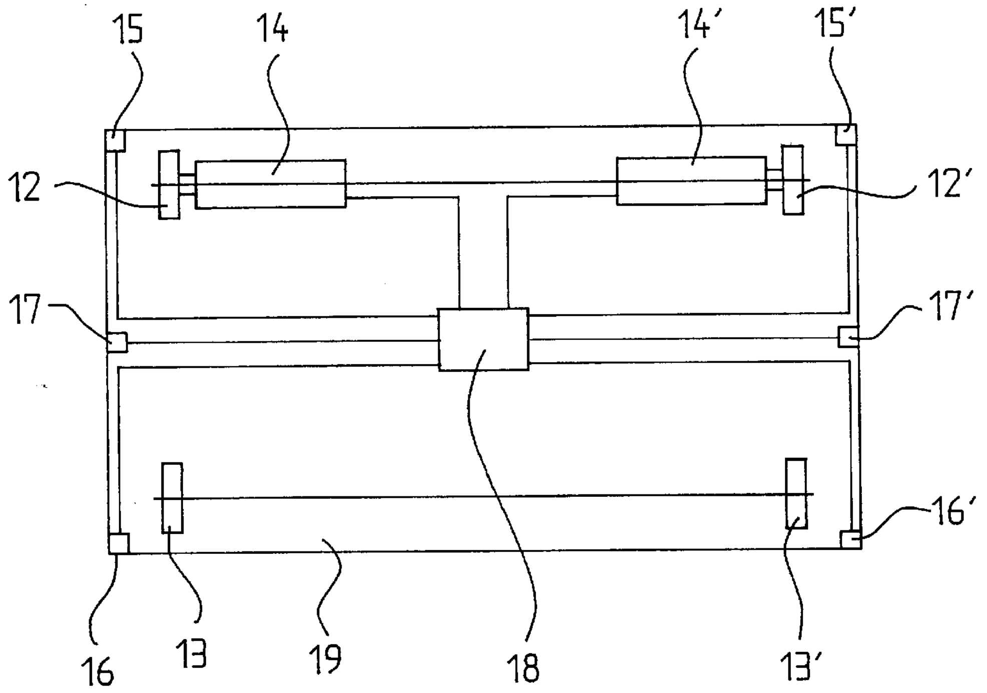
FIG. 3 is a bottom plan view of the plate of FIG. 2.

The plates 11 are explained in more detail by reference to FIGS. 2 and 3. The plate body 19 may be formed of die cast aluminium or another suitable material. Each plate 11 has two rollers (drive wheels) 12, 12', which are each driven by a respective electric motor 14, 14', as well as two non-driven rollers (sliding wheels) 13, 13'.

In the illustrated example a respective wiper 17, 17', which comprises, for example, a spring-loaded electrical carbon brush, is on each of the two sides of the plate 11. The wiper contacts a copper track which may be covered against dust and which is fastened to the moving walkway framework. Instead of a current supply by way of the current rails and wipers, one skilled in the art will recognize that other suitable devices for current supply, such as, for example, an inductive or capacitive energy supply or energy transmission, can be used as appropriate according to the invention without thereby changing the essence of the invention. The spacing between respectively adjacent plates is ascertained by way of four sensors 15, 15', 16, 16' mounted at the four corners of the plate 11. A control unit 18 controls, on the basis of the spacings ascertained by the sensors 15, 15', 16, 16', the electric motors 14, 14' so that the plates 11 in the region 1 (see FIG. 1) for the transport of persons run directly one after the other. The keeping together of the plates 11 is ensured electronically, so that no chain is required. This not only facilitates mounting of the plates, but also simplifies maintenance. There is thus also less incidence of contamination by lubricant.

The plates 11 are brought from the upper track to the lower track in tipping stations 3 and 4. It is in that case possible, as shown in FIG. 1, that the plate 11 is raised or lowered at one end by a lifting mechanism 5 or 6. However, appropriate rails with points can also be provided. The plate 11 is in that case inclined and then runs back horizontally. The electric motors 14, 14' integrated with the plate 11 then have to reverse their rotational direction at the rearward or forward dead center (if needed, a spring can be used for assistance), the points ensuring the required definite kinematic motion. The tipping stations 3, 4 are mounted at both ends of the moving walkway and protected by barriers 7, 8 from being walked on by passengers. The tipping stations 3, 4 are constructed so that the moving walkway can be operated in both directions.

A moving walkway according to the invention can be composed of several modules, wherein a tipping station is required only in front of the first and after the last module. Thus, moving walkways of any length can be economically produced. The modules can be assembled on site. There is no costly central drive; small motors, which are economically produced in mass production, can be used for the plates.

Moreover, in a chain-free moving walkway according to the invention the guide tracks and the shafts necessary for installation of a moving walkway can be provided at the building side of the installation. Only the self-propelled plates and the current supply devices thereof would remain to be installed. The costs of large free lengths of a conventional moving walkway framework which depend on the respective construction, and the guide tracks thereof are saved and the costs of such moving walkways are thereby reduced. Since cantilevered supports and guide tracks are not set into oscillation by the plates moving along thereon, a moving walkway of the present invention is distinguished by a high degree of quiet running.

Figure 4:
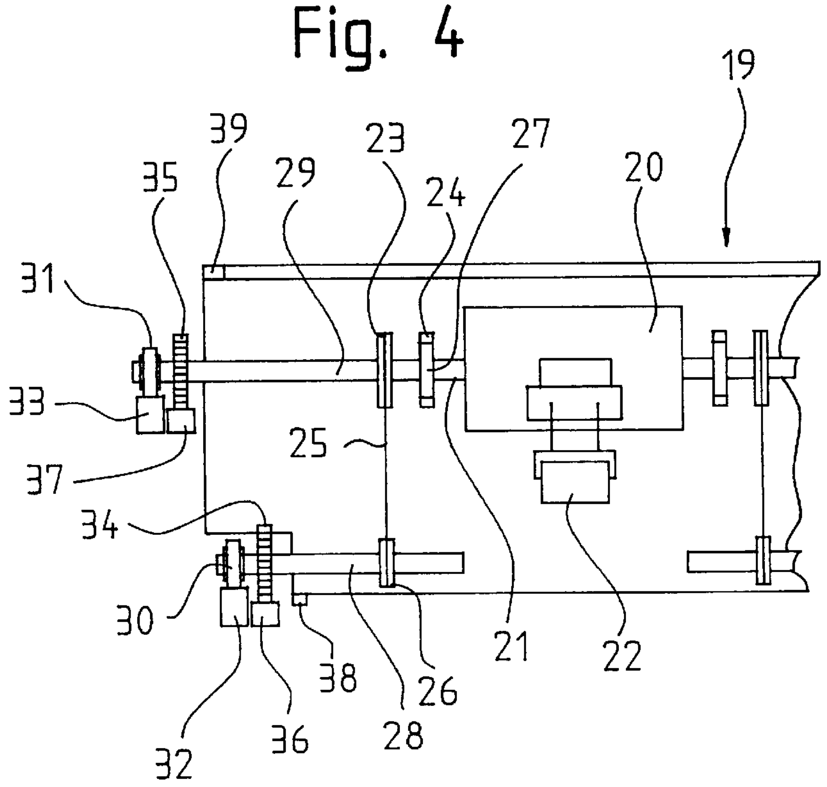
FIG. 4 is a bottom plan view of an example of an embodiment of an escalator step with a mechanically positive drive.

The view from below of an example of a step 19 of an escalator with a mechanically positive drive is illustrated in FIG. 4. An electric motor 20 with a motor shaft 21 parallel to the step front edge is centrally fastened to the underside of the step. The electric motor 20 is supplied with electrical energy by way of a wiper 22, the energy being tapped by the wiper 22 from a current rail (not illustrated) mounted along the travel path. The ends of the motor shaft 21 extend from both ends of the electric motor 20 and each drive two transmission pulleys 23, 24 fastened thereto. Transmission belts 25, which in turn transfer the rotational movement of the motor shaft 21 in each instance by way of transmission pulleys 26, 27 to roller axles 28, 29, are laid over each of the transmission pulleys 23, 24. Axially fixed on the ends of the roller axles 28, 29 which protrude laterally beyond the step 19, are respective free-running guide rollers 30, 31 which serve exclusively for support and guidance of the step 19, and run on guides 32, 33. Gearwheels 34, 35 are mounted and fastened to the roller axles 28, 29 at a small axial spacing from the corresponding guide roller 30 or 31. The belt drive so far described sets the gearwheels 34, 35 into rotation, wherein for transmission of the drive torque they engage and roll along gear racks 36, 37 mounted in a stationary position on both sides of the step 19 along the travel path and set the step 19 into longitudinal movement. A plurality of the steps 19 with gearwheel drive form a step belt, which is capable of conveying large conveyed loads at large angles of inclination of the travel path of the escalator at a uniform speed. The diameters of the transmission pulleys 23, 24, 26, 27 are so selected that the rotational speed of the motor shaft 21 is reduced to the intended slower rotational speed of the roller axles 28, 29 which, with the selected diameter of the gearwheels 34, 35, produces the desired speed of the step 19. The spacing from the respectively adjacent step 19 is in turn ascertained by way of four sensors 15, 15', 16, 16' which are mounted at the four corners of the plate 11. A control unit 18 controls the electric motors 20 in correspondence with the signals of the sensors and ensures, by electronic means, that the steps 19 stay together.

Figure 5:
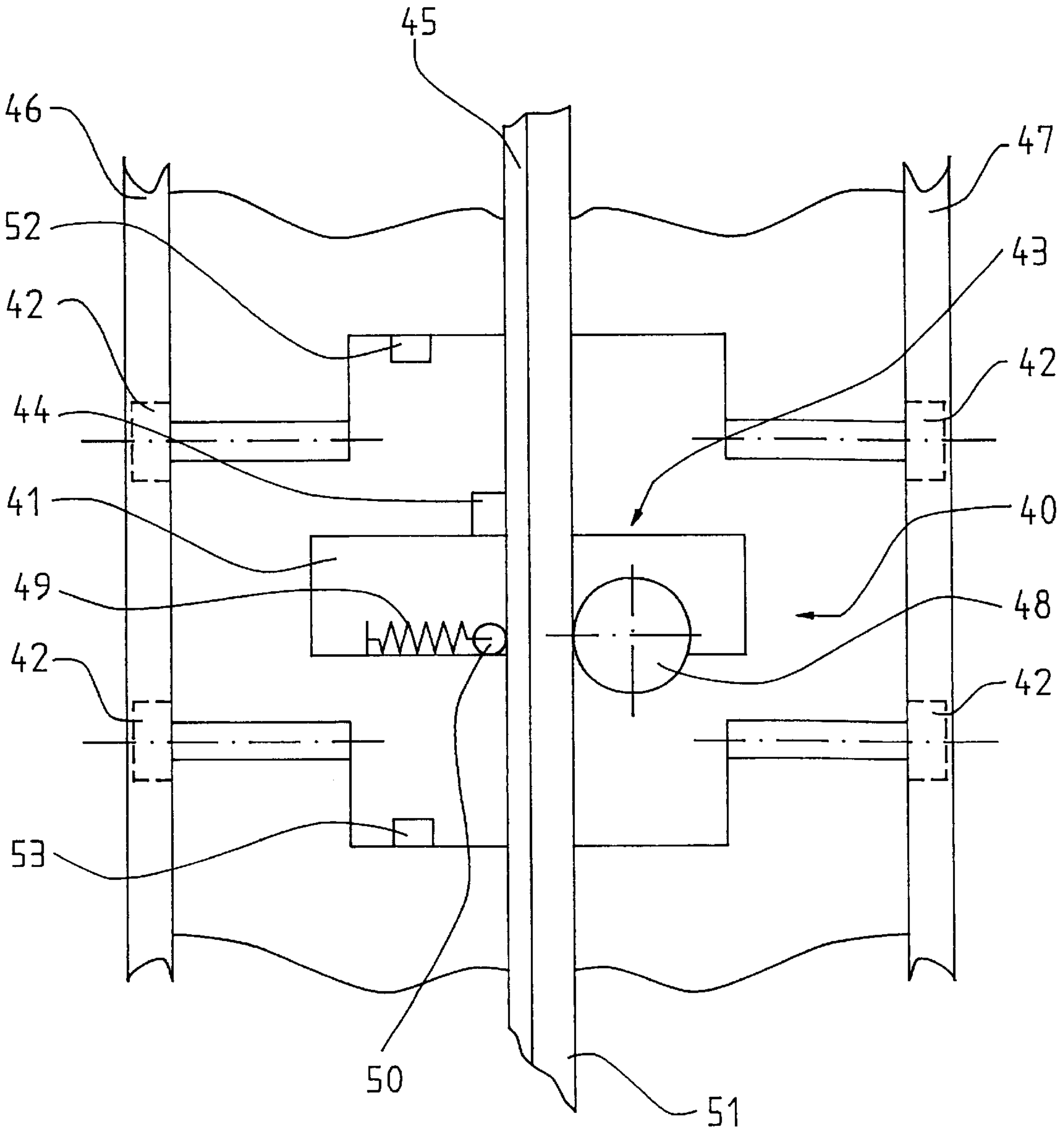
FIG. 5 shows a second embodiment of an escalator step which is directly driven by way of a geared motor and a friction wheel, of an escalator.

FIG. 5 shows a second example of a step 40, the guide rollers 42 of which roll—as non-driven rollers—along guide tracks 46, 47 in order to support and guide the step 40. The drive is effected by way of a so-called friction wheel drive 43 mounted at the step 40. The friction wheel drive 43 comprises a motor 41 which is fastened to the underside of the step 40 and which obtains electrical energy from a current rail 45 by way of a wiper 44. The motor 41 drives a friction wheel 48 by way of a gear transmission. The friction wheel 48 is pressed against a drive rail 51, which is mounted in a stationary position along the travel path, by means of a pressing roller 50 biassed by a spring 49. The friction wheel 48 rolls along the drive rail 51 and thus moves the step 40 relative thereto. The drive rail 51 and the current rail 45 are physically connected together. This simplifies mounting and ensures a reliable current supply of the electric motor 41. The control of the individual, directly driven steps 40 takes place, as in the previously described examples, with the help of sensors 52, 53 which in co-operation with a control unit electronically ensure that the steps 40 stay together.

I claim:

1. A conveying device for persons, comprising:

a plurality of independently-driven step bodies which run forward in one direction one after the other along a first portion of a guide track forming a travel path and run back in a second direction substantially thereunder, the step bodies being free of interconnecting chains, each step body having running rollers, drive electric motor means, current supply means for at least the motor means, at least one sensor for determining the spacing of the step body from an adjacent step body, a control electronic system coupled to the motor means and the at least one sensor to control the motor means in accordance with a signal from the at least one sensor; and respective tipping stations for inclining the step bodies located at first and second ends of the travel path.

2. A conveying device for persons according to claim 1, wherein the control electronic system includes means for running the step body back at a greater speed than the forward run speed.

3. A conveying device for persons according to claim 1 or claim 2, further comprising a current supply rail located along the guide track, the step body having a wiper to contact the current supply rail, the current supply rail having a copper track, the wiper having a spring-loaded electrical carbon brush.

4. A conveying device for persons according to claim 3, wherein the guide track is mounted at a building side of the conveying device.

5. A conveying device for persons according to claim 1 or claim 2, wherein the motor means comprise two mutually independent electric motors, each of the motors being coupled to a separate running roller.

6. A conveying device for persons according to claim 1 or claim 2, wherein the step body has a friction wheel drive which co-operates with a stationary drive rail arranged along the travel path.

7. A conveying device for persons according to claim 1 or claim 2, wherein the running rollers are each mounted on a respective roller axle, at least one of the roller axles having a gearwheel which co-operates with a stationary rack arranged along the travel path, the electric motor means driving the gearwheel.

8. A step body for a conveying device, the step body including running rollers, at least one of the rollers being driven by electric motor mean mounted on the step body, the motor means comprising two mutually independent electric motors, each of the motors being coupled to a separate running roller; current supply means for at least the motor means; at least one sensor for determining the spacing of the step body from an adjacent step body; and a control electronic system coupled to the motor means and the at least one sensor to control the motor means in accordance with a signal from the at least one sensor.

9. A step body for a conveying device, the step body including running rollers, at least one of the rollers being driven by electric motor mean mounted on the step body; current supply means for at least the motor means; at least one sensor for determining the spacing of the step body from an adjacent step body; and a control electronic system coupled to the motor means and the at least one sensor to control the motor means in accordance with a signal from the at least one sensor, the step body having a friction wheel drive which co-operates with a stationary drive rail arranged along a travel path for the step body.

10. A step body for a conveying device, the step body including running rollers, at least one of the rollers being driven by electric motor mean mounted on the step body; current supply means for at least the motor means; at least one sensor for determining the spacing of the step body from an adjacent step body; and a control electronic system coupled to the motor means and the at least one sensor to control the motor means in accordance with a signal from the at least one sensor, the running rollers being each mounted on a respective roller axle, at least one of the roller axles having a gearwheel which co-operates with a stationary rack arranged along a travel path for the step body, the electric motor means driving the gearwheel.

* * * * *